United States Patent [19]
Günter

[11] 3,879,193
[45] Apr. 22, 1975

[54] PROCESS FOR DIRECTLY REDUCING MATERIALS CONTAINING IRON OXIDE IN A ROTARY KILN IN CONCURRENT FLOW OPERATION

[75] Inventor: Heitmann Günter, Frankfurt, Main, Germany

[73] Assignee: Metallgesellschaft Aktiengesellschaft, Frankfurt, Germany

[22] Filed: Dec. 17, 1971

[21] Appl. No.: 209,444

Related U.S. Application Data

[63] Continuation of Ser. No. 795,069, Jan. 29, 1969, abandoned.

[30] Foreign Application Priority Data
Feb. 8, 1968    Germany .......................... 1583954

[52] U.S. Cl. ............................................. 75/35
[51] Int. Cl. ............................................ C21b 13/08
[58] Field of Search ......................... 75/33–36, 38, 75/39, 46, 44, 90

[56] References Cited
UNITED STATES PATENTS

| | | | |
|---|---|---|---|
| 1,786,999 | 12/1930 | Hornsey ................................ | 75/36 |
| 2,855,290 | 10/1958 | Freeman ............................... | 75/33 |
| 2,986,460 | 5/1961 | Babcock et al. ...................... | 75/44 R |

FOREIGN PATENTS OR APPLICATIONS

| | | | |
|---|---|---|---|
| 1,123,406 | 9/1969 | United Kingdom .................... | 75/33 |

*Primary Examiner*—L. Dewayne Rutledge
*Assistant Examiner*—M. J. Andrews
*Attorney, Agent, or Firm*—James F. Jones

[57] ABSTRACT

The hot exhaust gases discharged from a rotary kiln in which iron oxides are reduced in concurrent flow with the gases, are to dry and then preheat the cooled reduced iron oxides for further processing, and for other process steps.

7 Claims, 2 Drawing Figures

PROCESS FOR DIRECTLY REDUCING MATERIALS CONTAINING IRON OXIDE IN A ROTARY KILN IN CONCURRENT FLOW OPERATION

This is a continuation of application Ser. No. 795,069, filed Jan. 29, 1969, now abandoned.

This invention relates to a process for directly reducing materials containing iron oxide in a rotary kiln by means of solid carbonaceous reducing agents, in which process the kiln charge and the kiln atmosphere move in concurrent flows and the matter discharged from the kiln is cooled and separated.

In a direct reducing process, a rotary kiln in concurrent flow operation has certain advantages compared to a rotary kiln in countercurrent flow operation. For instance, reducing coal having a smaller particle size can be used without a risk of a removal of substantial amounts of unreacted coal by the exhaust gases of the kiln.

In the reducing zone, where the gases have the highest velocity, the diameter of the kiln can be enlarged so that the residence time of the charge in the kiln is prolonged and the dust content in the exhaust gas can be reduced.

The charge can be heated more quickly to the reducing temperature.

These advantages are opposed by the great disadvantage that the hot exhaust gases are withdrawn at the discharge end of the rotary kiln. For the economy of the process it is essential that the sensible and latent heat contents of said gases be utilized. In connection with a concurrent flow operation of rotary kilns, suggestions have been to use the hot exhaust gases in order to dry the iron ore and preheat the combustion air as set forth in U.S. Pat. No. 2,792,298; 2,855,290; and 1,937,822. For this purpose, the hot exhaust gases must be recirculated from the discharge end to the corresponding processing stations disposed near the charging end of the rotary kiln. This recirculation of the exhaust gases involved a high expense. Owing to the very hot exhaust gas temperatures, the gas conduits must consist of heat insulated walled ducts. Nevertheless, considerable heat losses are inevitable. Besides, there are virtually no blowers which can be operated at these temperatures. For this reason, only rotary kilns for countercurrent flow operation have recently been used in practice.

It is an object of this invention to produce a process avoiding the disadvantages of the concurrent flow processes.

In general, this object is obtained according to this invention in that the heat content at least of a partial stream of the exhaust gases from the kiln is used to heat the cooled and separated sponge iron product under non-oxidizing conditions before or when said product is subjected to further processing.

The separated sponge iron product may be briquetted or pelletized and before its further processing is heated under non-oxidizing conditions with the aid of the hot exhaust gases from the kiln. The further processing may comprise, for example, of the melting of the iron in an electric furnace. If the matter discharged from the kiln is indirectly cooled and is separated under dry conditions, the sponge iron product will only be heated. If a direct cooling with the aid of water is used or the separation is effected under wet conditions, the sponge iron product will be dried first and heated thereafter. During this heating, any oxide which may have formed in small amounts during the cooling step is removed.

Depending on the particle size of the sponge iron product, the same may be dried and heated in shafts, rotary drums or fluidized beds or on travelling grates or the like.

In another modification of the process of this invention, the small size particles of the sponge iron product which are separated from the matter discharged from the kiln are briquetted or pelletized to form lumps, and the latter are hardened with the aid of the exhaust gases from the rotary kiln so that they have the strength required for transit.

For these purposes, the exhaust gas from the rotary kiln may be subjected to partial afterburning if this is required. The sensible and latent heat contents of the gas which emerges from this stage may be utilized for a preheating of feed water and/or for a recovery of steam. Any partial stream of the exhaust gases from the rotary kiln which has not been supplied to this stage may be utilized in the same way.

In a preferred mode of utilizing the sensible heat content and particularly the latent heat content of the gases which leave the stage in which the matter discharged from the kiln is dried and/or heated, these gases are used for drying and/or heating the components of the charge before they are charged to the rotary kiln. The process according to this invention is unique in enabling this utilization because the gases to be recirculated are now relatively cold. This means that they have a lower sensible heat content and can be recirculated in normal conduits without high heat losses, whereas their latent heat content is very high and can be liberated by subjecting the gases to afterburning at the point where their latent heat content is to be utilized.

Sulfur-combining admixtures, such as limestone or dolomite, may be added to the charge if this is required. The charge may comprise fine-grained ore, such as Humphrey spiral concentrates or lump materials comprising iron oxide, green pellets or hardened pellets.

The rotary kiln is provided with shell mounted nozzles for a supply of oxygen-containing gases, preferably air, or with shell mounted burners for a supply of combustible gases and air. The outlet openings of the shell nozzles or shell burners preferably face in a direction which is oblique to and opposite the direction of flow of the kiln atmosphere.

The cooling may be indirect or direct. It is preferred to effect a direct cooling in that the matter discharged from the kiln is immersed in or sprayed with water.

The surplus coke is separated in known manner from the matter discharged from the kiln and is either recirculated into the kiln in known manner or is used for known purposes, for example, together with the hot gases of the kiln for the generation of stream.

The reducing agent used in the rotary kiln consists preferably of rich coal because this produces a strongly reducing atmoshphere in the rotary kiln and is less expensive in most cases.

At least part of the rich coal is preferably blown into the rotary kiln together with oxygen-containing gases for the rotary kiln so that at least part of the blown-in coal is carried beyond the heating-up zone into the reducing zone and the coal is distributed on the surface of the kiln charge over a considerable part of the length of the rotary kiln. This results in the advantage that a considerable part of the length of the kiln comprising various sections thereof is supplied with coal only at the rate at which coal is required in each section for effecting a reduction at a maximum rate and that the volatile constituents are utilized for the reduction because they are partly volatilized in the bed formed by the charge in the reducing zone of the kiln and flow through said bed.

In this operation, at least part of the sulfur-containing substances is blown into the kiln, either separately or together with the reducing agent.

The particle size of the reducing agents which are employed is desirably less than 4 millimeters and preferably less than 2 millimeters. The particle size of the sulfur-combining substances is suitably less than 2 millimeters and preferably less than 1 millimeter.

In another modification of the process of this invention, two rotary kilns are combined so that the direction of flow of material and gas in one rotary kiln is opposed to the direction of flow of material and gas in the other rotary kiln.

At least a partial stream of the hot exhaust gases from one rotary kiln can then be used to dry and/or heat the charge and/or combustion air for use in the other rotary kiln, and long supply conduits for the exhaust gases are not required for this purpose.

The main advantages of the process of this invention are summarized as follows:

The practice of this invention avoids the abovedescribed disadvantages of the concurrent flow process.

A direct cooling with the aid of water may be adopted rather than an expensive indirected cooling, effected in a non-oxidizing atmosphere, of the matter of discharged from the kiln. Where rich coal is entrained in air, the latter will react with the fuel in the heating-up zone or in the zone where the metallization begins. Contrary to the counter-current flow process, any non-permissible temperature rise which may result in a formation of crusts and in collaring will be avoided. Besides, the coal is introduced into the kiln with gas flowing at higher velocities so that the coal will be carried further into the kiln at a given rate of entraining air and comparable other conditions.

Figure 1:
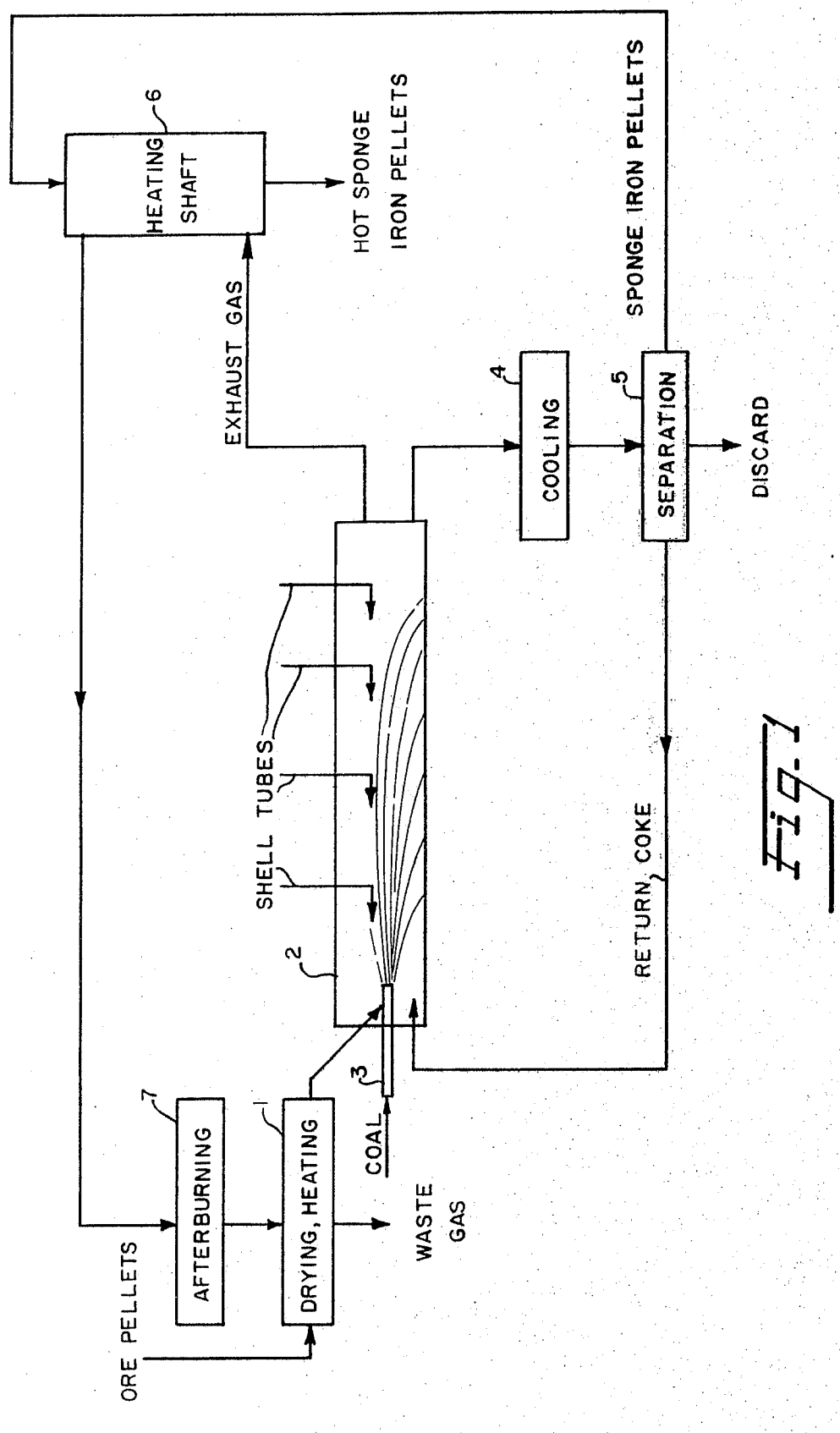
FIG. 1 is a flow sheet of a process carried out in accordance with the present invention wherein one reduction rotary kiln is employed.

As illustrated in FIG. 1, ore pellets are fed onto a traveling grate 1 where they are dried and heated. From the traveling grate 1, the pellets are then fed into a rotary kiln 2 and are subjected to contact with highly volatile coal particles therein. The coal particles are blown into the rotary kiln 2 by conventional blowing means 3 with the coal particles being distributed over a considerable length of the kiln 2. The material treated in the kiln 2 is discharged therefrom and passed to a cooling zone 4 where the material is cooled. The cooled product is next passed to a separation zone 5 where separation of the material by a screening and magnetic separation occurs. Coke is collected from the separation zone 5 and is recirculated by the return coke line back into the rotary kiln 2. The residue material, such as, for example, coal ash, dolomite, and the like, is then discharged from the separation zone. The sponge iron pellets are separated in the separation zone 5 and are thereafter fed into the heating shaft 6. The sponge iron pellets are heated in heating shafts 6 by the exhaust gases obtained from the rotary kiln 2. The hot sponge iron pellets are discharged from the heating shaft 6 and fed to electric arc furnaces (not shown). The gas obtained from the heating shaft 6 is fed to the afterburning chamber 7 where it is afterburned and then used in the traveling grate 1 to heat the pellets and from there it will leave as waste gas.

Figure 2:
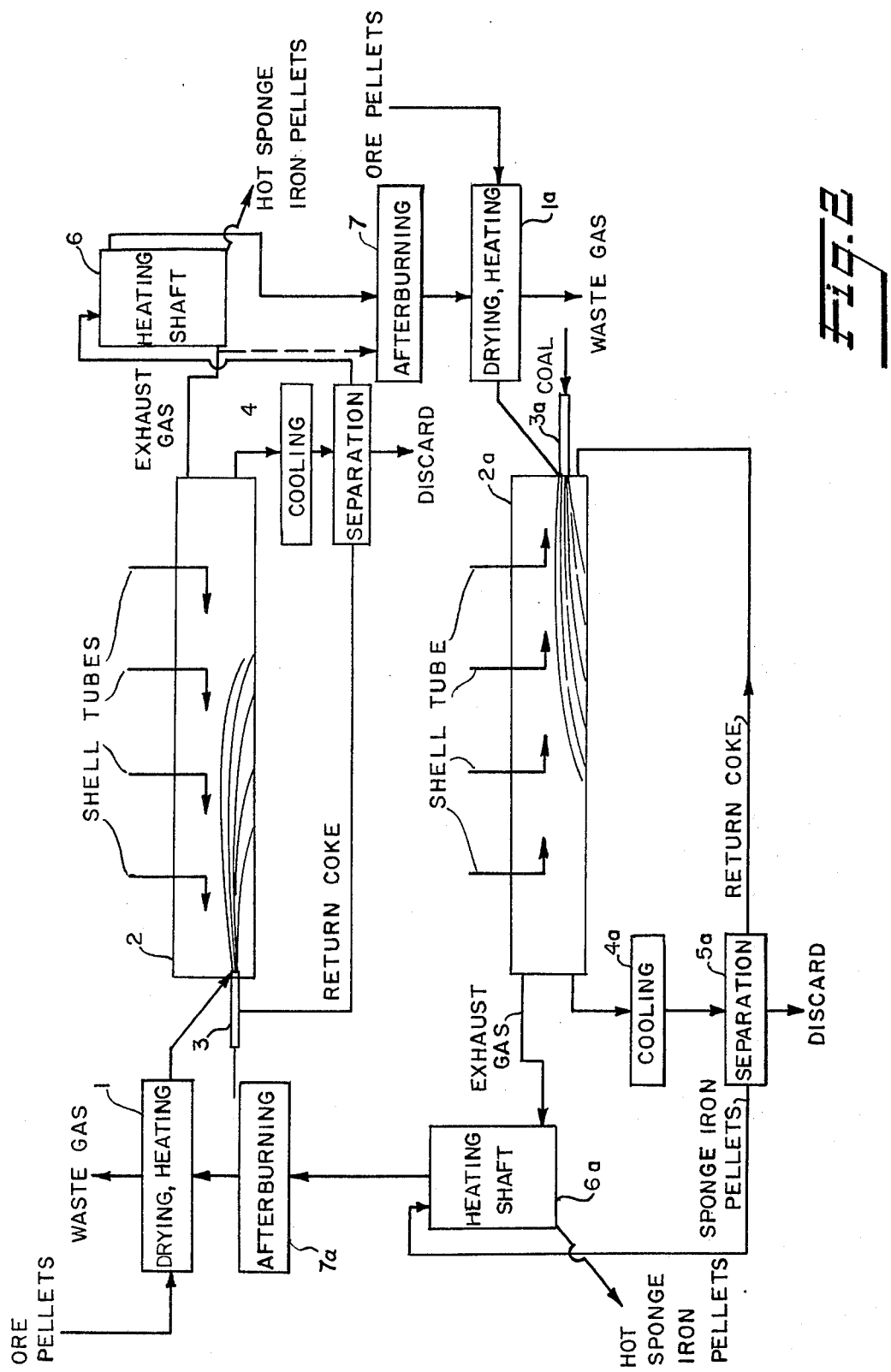
FIG. 2 is a flow sheet of a process carried out in accordance with the present invention wherein two reduction rotary kilns are used with the kilns being combined so that the direction of flow of material and gas in one rotary kiln is opposite to the direction of flow of material and gas in the other rotary kiln, thus producing a countercurrent flow therebetween.

Referring now to the flow diagram shown in FIG. 2 wherein two rotary kilns are employed, it will be seen that the ore pellets are fed onto the traveling grates 1 and 1a to be dried and heated, with such feed being in an opposite counter-current flow to one another. The ore pellets is a heated state are then fed to the rotary kilns 2 and 2a where they are contacted with volatile coal particles, the coal being blown into the rotary kilns by a conventional blowing means 3 and 3a in the same manner as with a single kiln. The treated material is discharged from the kilns 2 and 2a and transported to the respective cooling zones 4 and 4a where the material is cooled and then passed to the respective separation zones 5 and 5a. The material is separated in each of the separation zones 5 and 5a in the same manner as hereinbefore described with a single kiln, with the coke being returned to the respective kilns 2 and 2a. The residue material is discharged from each of the separation zones 5 and 5a, and the sponge iron pellets fed to the heating shafts 6 and 6a to be heated by the exhaust gases from the kilns 2 and 2a and then discharged to the respective electric arc furnaces.

In FIG. 2 the gas from heating shaft 6 is fed to the afterburning chamber 7 where it is afterburned and then introduced into the traveling grate 1a while the gas from heating shaft 6a is fed to burning chamber 7a and then added to traveling grate 1. Part of the hot exhaust gas from the rotary kiln 2 can be added directly to the burning chamber 7 and the traveling grate 1a (dotted line) and part of the hot exhaust gas from the rotary kiln 2a added directly to burner chamber 7a and traveling grate 1. This is possible due to the short gas conduits present as a result of the arrangement of the rotary kilns.

EXAMPLE 1

A rotary kiln was used which had a length of 12 meters and an inside diameter of 0.8 meter. The rotary kiln was provided with eight shell mounted nozzles, which were distributed throughout its length, and the kiln had an injecting device for blowing coal into the kiln at the charging end thereof.

The ore which was charged was a hematite containing 68% Fe. Specifically, the ore had the following composition in percent by weight:

| | |
|---|---|
| Total Fe | 68.4 |
| $Fe^{2+}$ | 0.3 |
| S | 0.01 |
| P | 0.03 |
| $SiO_2$ | 1.0 |

Pellets which were 8–15 millimeters in diameter were made from the ore, heated to about 1050° C on a traveling grate and charged at a rate of 12 metric tons per day to the rotary kiln at the charging end thereof.

Coke for recirculation was separated from the discharged matter and was charged to the rotary kiln at the charging end thereof at a rate of 1.2 metric tons per day (basis: 0.815 metric ton $C_{fixed}$/day in recirculation; 68% $C_{fixed}$ in recirculated coke).

5.02 metric tons fresh coal per day (basis: 30% volatiles; 0.28–0.3 metric ton $C_{fixed}$/metric ton Fe in the ore) were blown by the injecting device by means of entraining air into the rotary kiln at the charging end thereof. This fresh coal had a particle size below 4 millimeters and the following composition in percent by weight:

| | |
|---|---|
| $H_2O$: | 2.4 |
| Ash: | 19.4 |
| $C_{fixed}$: | 48.9 |
| Volatiles: | 29.3 |

Dolomite having a particle size of 0.1–1 millimeter and at a rate of 0.24 metric ton per day (basis: 2% of charged ore) was admixed to the fresh coal and blown into the kiln together with said fresh coal.

The matter discharged from the rotary kiln was cooled in water. The metallization amounted to 95%.

When the discharged matter had been cooled, it was divided by screening into the following fractions:
a. above 6 millimeters (sponge iron pellets)
b. 6–1 millimeters
c. below 1 millimeter.

Fraction (b) was magnetically separated into sponge iron and coke, the latter for recirculation.

Sponge iron was magnetically separated from fraction (c). The non-magnetic constitutents of fraction (c) (coal ash, dolomite) were discarded.

The sponge iron of fraction (b) amounted only to 3% of the total sponge iron and was directly charged to an electric arc furnace for making steel.

The sponge iron from fraction (c) amounted also to 3% and was recirculated to the pelletizing apparatus.

Fraction (a) was charged into a reheating well. This well was supplied from below through an annular duct with the exhaust gas from the rotary kiln. This exhaust gas had an inlet temperature of about 1100° C, flowed upwardly in the well and was withdrawn from the top at a temperature of about 500° C. The sponge iron pellets were withdrawn from the well at a temperature of about 1000° C and were directly charged into an electric arc furnace.

Shortly before the means for preheating the ore pellets, the exhaust gas from the reheating well was subjected to afterburning with addition of air and was supplied to the traveling grate at a temperature of about 500° C.

EXAMPLE 2

In this procedure, two rotary kilns were positioned one over the other so that the discharge end of one kiln was disposed direclty over the charging end of the other, and vice versa. The process conditions were the same as in Example 1. When the exhaust gas from one rotary kiln had flown through the reheating well, said gas was supplied to the preheater associated with the other rotary kiln. This arrangement resulted in particularly short gas flow paths. The matter discharged from the kiln was processed as in Example 1.

Having now described the means by which the objects of the invention are obtained,

I claim:

1. In a process for producing a sponge iron product wherein the feed material containing iron oxide is preheated and fed to the charge end of a rotary kiln with a solid carbonaceous reducing agent to constitute the kiln charge therefor, the kiln charge and the kiln atmosphere is then moved concurrently in the kiln at an elevated temperature to achieve a reduction of said feed material therein, the resulting reduced material containing sponge iron is withdrawn from the discharge end of the rotary kiln, the sponge iron is thereafter cooled and separated therefrom and the exhaust gases having a temperature on the order of about 1100°C are discharged from the discharge end of said kiln, the improvement in combination therewith comprising contacting the cooled and separated sponge iron with at least a portion of the hot exhaust gases recovered from the discharge end of said kiln under non-oxidizing conditions adjacent the discharge end of and outside the kiln to produce a heated sponge iron product thereby cooling the exhaust gases to at least about 500°C, thereby permitting the ready transfer of said gases, transferring the cooled exhaust gases and using the transferred cooled exhaust gases to preheat said feed material containing iron oxide.

2. A process in accordance with claim 1, which includes passing the cooled exhaust gases to an afterburning zone to be afterburned at the point where such gases are used to heat the kiln charge.

3. A process in accordance with claim 1, which includes feeding a kiln charge containing preheated feed material containing iron oxide to a first rotary kiln and feeding a kiln charge containing preheated feed material containing iron oxide to a second rotary kiln, the first and second rotary kilns being positioned such that the direction of flow of the kiln charge and the kiln atmoshphere in said first kiln is countercurrent to the direction of flow of the kiln charge and kiln atmosphere in said second kiln, and preheating the feed material of the kiln charge for the first kiln with the transferred cooled exhaust gases obtained from said second kiln after heating the cooled and separated sponge iron pellets from said second kiln and vice versa with respect to the feed material for the second kiln and the exhaust gases from the first kiln.

4. A process in accordance with claim 1 which includes contacting the reduced material obtained from the rotary kiln directly with water to cool same.

5. A process in accordance with claim 1, in which the reducing agent is a gas rich coal.

6. A process in accordance with claim 5, which includes blowing the gas rich coal into the charging end of the rotary kiln.

7. A process in accordance with claim 6, wherein said reducing agent has a particular size less than 4 millimeters.

* * * * *